(12) United States Patent
Mochizuki et al.

(10) Patent No.: US 10,693,190 B2
(45) Date of Patent: Jun. 23, 2020

(54) MATERIAL FOR ELECTRODE, ELECTRODE SHEET FOR ALL-SOLID STATE SECONDARY BATTERY, ALL-SOLID STATE SECONDARY BATTERY, AND METHODS FOR MANUFACTURING ELECTRODE SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Hiroaki Mochizuki, Kanagawa (JP); Hiroshi Kaga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 83 days.

(21) Appl. No.: 15/993,899

(22) Filed: May 31, 2018

(65) Prior Publication Data

US 2018/0277901 A1    Sep. 27, 2018

Related U.S. Application Data

(63) Continuation of application No. PCT/JP2016/085413, filed on Nov. 29, 2016.

(30) Foreign Application Priority Data

Dec. 16, 2015  (JP) ................. 2015-245266

(51) Int. Cl.
*H01M 4/62* (2006.01)
*H01M 10/0585* (2010.01)
(Continued)

(52) U.S. Cl.
CPC ......... *H01M 10/0585* (2013.01); *H01M 4/13* (2013.01); *H01M 4/139* (2013.01);
(Continued)

(58) Field of Classification Search
None
See application file for complete search history.

(56) References Cited

U.S. PATENT DOCUMENTS

2014/0377627 A1   12/2014  Furuya et al.
2015/0270585 A1*   9/2015  Sasaoka .............. H01M 2/1077
                                                       429/90

FOREIGN PATENT DOCUMENTS

JP         7-211320 A     8/1995
JP         10-255764 A    9/1998
(Continued)

OTHER PUBLICATIONS

JP-2014035818-A English machine translation (Year: 2014).*
(Continued)

*Primary Examiner* — Scott J. Chmielecki
(74) *Attorney, Agent, or Firm* — Sughrue Mion, PLLC (57) ABSTRACT

Provided are a material for an electrode including an active material, a sulfide-based inorganic solid electrolyte having conductivity for ions of metal elements belonging to Group I or II of the periodic table, and an auxiliary conductive agent having at least one metal atom belonging to Group XII, XIII, or XIV of the periodic table, in which a specific surface area of the auxiliary conductive agent is 1 to 500 $m^2/g$, and a ratio between a major axis length and a minor axis length of a particle constituting the auxiliary conductive agent is 1.5 or more, an electrode sheet for an all-solid state secondary battery and an all-solid state secondary battery in which the material for an electrode is used, and methods for manufacturing an electrode sheet for an all-solid state secondary battery and an all-solid state secondary battery.

9 Claims, 1 Drawing Sheet

(51) Int. Cl.
    *H01M 10/0562* (2010.01)
    *H01M 4/13* (2010.01)
    *H01M 4/139* (2010.01)
    *H01M 4/1391* (2010.01)
    *H01M 4/505* (2010.01)
    *H01M 4/525* (2010.01)
    *H01M 10/0525* (2010.01)

(52) U.S. Cl.
    CPC ......... *H01M 4/1391* (2013.01); *H01M 4/505* (2013.01); *H01M 4/525* (2013.01); *H01M 4/62* (2013.01); *H01M 4/624* (2013.01); *H01M 10/0525* (2013.01); *H01M 10/0562* (2013.01); *H01M 2300/0068* (2013.01)

(56) References Cited

FOREIGN PATENT DOCUMENTS

| JP | H10255764 A | * | 9/1998 |
|---|---|---|---|
| JP | 11-007942 A | | 1/1999 |
| JP | 2001-068116 A | | 3/2001 |
| JP | 2001-068150 A | | 3/2001 |
| JP | 2001-126757 A | | 5/2001 |
| JP | 2010-262764 A | | 11/2010 |
| JP | 2011-165410 A | | 8/2011 |
| JP | 2012-243743 A | | 12/2012 |
| JP | 2013-051171 A | | 3/2013 |
| JP | 2013-157195 A | | 8/2013 |
| JP | 2014-035818 A | | 2/2014 |
| JP | 2014035818 A | * | 2/2014 |
| WO | 2013/121642 A1 | | 8/2013 |
| WO | 2014-020654 A1 | | 2/2014 |

OTHER PUBLICATIONS

JP-H10255764-A (Year: 1998).*
Communication dated May 21, 2019, from the Japanese Patent Office in counterpart application No. 2017-555961.
International Search Report, issued in International Application No. PCT/JP2016/085413 dated Feb. 7, 2017.
Written Opinion in Application No. PCT/JP2016/085413 dated Feb. 7, 2017.
International Preliminary Report on Patentability, issued in International Application No. PCT/JP2016/085413 dated Jun. 19, 2018.

* cited by examiner

MATERIAL FOR ELECTRODE, ELECTRODE SHEET FOR ALL-SOLID STATE SECONDARY BATTERY, ALL-SOLID STATE SECONDARY BATTERY, AND METHODS FOR MANUFACTURING ELECTRODE SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2016/085413 filed on Nov. 29, 2016, which claims priority under 35 U.S.C. § 119 (a) to Japanese Patent Application No. 2015-245266 filed in Japan on Dec. 16, 2015. Each of the above applications is hereby expressly incorporated by reference, in its entirety, into the present application.

BACKGROUND OF THE INVENTION

1. Field of the Invention

The present invention relates to a material for an electrode, an electrode sheet for an all-solid state secondary battery, an all-solid state secondary battery, and methods for manufacturing an electrode sheet for an all-solid state secondary battery and an all-solid state secondary battery.

2. Description of the Related Art

In the related art, electrolytic solutions have been used in lithium ion batteries. Attempts are underway to produce all-solid state secondary batteries in which all constituent materials are solid by replacing the electrolytic solution with a solid electrolyte. Reliability in terms of overall performance of batteries is an advantage of techniques of using inorganic solid electrolytes. For example, to electrolytic solutions being used for lithium ion secondary batteries, flammable materials such as carbonate-based solvents are applied as media. In the above-described lithium ion secondary batteries, a variety of safety measures are employed. However, there is a concern that disadvantages may be caused during overcharging and the like, and there is a demand for additional efforts. All-solid state secondary batteries in which non-flammable electrolytes can be used are considered as a fundamental solution therefor.

An advantage of all-solid state secondary batteries is the suitability for increasing the energy density by stacking electrodes. Specifically, it is possible to produce batteries having a structure in which electrodes and electrolytes are directly arranged in series. In the above-described structure, metal packages that seal battery cells and copper wires or bus-bars that connect battery cells may not be provided, and thus the energy density of batteries can be significantly increased. In addition, favorable compatibility with positive electrode materials capable of increasing potentials and the like can also be considered as advantages.

Due to the respective advantages described above, all-solid state secondary batteries are being developed as next-generation lithium ion batteries (New Energy and Industrial Technology Development Organization (NEDO), Fuel Cell and Hydrogen Technologies Development Department, Electricity Storage Technology Development Section, "NEDO 2013 Roadmap for the Development of Next Generation Automotive Storage Battery Technology" (August, 2013)). For example, WO2013/121642A describes that it is possible to provide an all-solid state secondary battery having an excellent rate characteristic in which a particulate solid electrolyte and a particulate auxiliary conductive agent are bonded to a surface of a particulate electrode active material in an electrode. JP2011-165410A describes a large-capacity all-solid state lithium ion secondary battery including a solid electrolyte layer which includes lithium ion-conductive crystals and a battery element having a collector layer laminated on at least one of a positive electrode layer or a negative electrode layer. In addition, JP2012-243743A describes an all-solid state lithium ion battery having a positive electrode layer having a high output voltage and a discharge capacity that does not easily decrease due to repetitive charging and discharging by containing a positive electrode active material made of a specific composition and a lithium ion-conductive solid electrolyte.

SUMMARY OF THE INVENTION

WO2013/121642A, JP2011-165410A, and JP2012-243743A describe that an auxiliary conductive agent is added to an electrode active material layer. The auxiliary conductive agent is used to improve the electron conductivity in the electrode active material layer. The continuous contact between the auxiliary conductive agent and an electrode active material improves the electron conductivity of the electrode active material layer. However, the contact area between the electrode active material and the solid electrolyte decreases by the contact area between the auxiliary conductive agent and the electrode active material, and the ion conductivity decreases. That is, the improvement of the ion conductivity and the improvement of the electron conductivity have a trade-off relationship. Therefore, in a case in which the auxiliary conductive agent is added to the electrode active material layer, it is necessary to suppress a decrease in the ion conductivity of the electrode active material layer in order to favorably maintain the output characteristic. In addition, in a case in which the amount of the auxiliary conductive agent added is too great, the amount of the active material in the electrode active material layer decreases, and the discharge capacity decreases.

Therefore, an object of the present invention is to provide a material for an electrode capable of realizing a favorable discharge capacity and a favorable output characteristic in an all-solid state secondary battery. In addition, an object of the present invention is to provide an electrode sheet for an all-solid state secondary battery and an all-solid state secondary battery for which the material for an electrode is used. Furthermore, an object of the present invention is to provide methods for manufacturing the electrode sheet for an all-solid state secondary battery and the all-solid state secondary battery.

In consideration of the above-described problems, the present inventors carried out intensive studies in order to improve both the lithium ion conductivity and the electron conductivity in the case of using a sulfide-based inorganic solid electrolyte. The present inventors found that, in a case in which the specific surface area of an auxiliary conductive agent and the ratio of the axial lengths of particles constituting the auxiliary conductive agent are both set in specific ranges, it is possible to produce an all-solid state secondary battery which is imparted with a sufficient electron conductivity and is improved in both the discharge capacity and the output characteristic without decreasing the ion conductivity. The present invention has been made on the basis of this finding.

That is, the object is achieved by the following means.

<1> A material for an electrode comprising: an active material; a sulfide-based inorganic solid electrolyte having conductivity for ions of metal elements belonging to Group I or II of the periodic table; and an auxiliary conductive agent having at least one metal atom belonging to Group XII, XIII, or XIV of the periodic table, in which a specific surface area of the auxiliary conductive agent is 1 to 500 m$^2$/g, and a ratio between a major axis length and a minor axis length of a particle constituting the auxiliary conductive agent is 1.5 or more.

<2> The material for an electrode according to <1>, in which the auxiliary conductive agent includes at least one oxide of a metal atom belonging to Groups XII, XIII, and XIV of the periodic table.

<3> The material for an electrode according to <1> or <2>, in which the metal atom belonging to Groups XII, XIII, and XIV of the periodic table is Zn, Cd, Ga, In, Ge, Sn, or Pb.

<4> The material for an electrode according to any one of <1> to <3>, in which the sulfide-based inorganic solid electrolyte is amorphous.

<5> The material for an electrode according to any one of <1> to <4>, in which a content of the auxiliary conductive agent is 0.01% to 10% by mass with respect to 100% by mass of all solid components.

<6> An electrode sheet for an all-solid state secondary battery comprising: a layer of the material for an electrode according to any one of <1> to <5> on a metal foil.

<7> An all-solid state secondary battery comprising: a positive electrode active material layer; a negative electrode active material layer; and an inorganic solid electrolyte layer, in which at least one of the positive electrode active material layer or the negative electrode active material layer is a layer of the material for an electrode according to any one of <1> to <5>.

<8> A method for manufacturing an electrode sheet for an all-solid state secondary battery, comprising: applying the material for an electrode according to any one of <1> to <5> onto a metal foil to produce an electrode active material layer.

<9> A method for manufacturing an all-solid state secondary battery including a positive electrode active material layer, a solid electrolyte layer, and a negative electrode active material layer in this order, the method comprising: manufacturing the all-solid state secondary battery using the manufacturing method according to <8>.

In the present specification, numerical ranges expressed using "to" include numerical values before and after "to" as the lower limit value and the upper limit value.

In the present specification, in the case of being simply expressed, "acryl" is used to refer to both methacryl and acryl.

The above-described and other characteristics and advantages of the present invention will be further clarified by the following description with appropriate reference to the accompanying drawings.

In a case in which the material for an electrode of the present invention is used to produce an all-solid state secondary battery, it is possible to realize an all-solid state secondary battery in which the discharge capacity is improved and a favorable output characteristic is exhibited. In addition, in a case in which the electrode sheet for an all-solid state secondary battery of the present invention is used in an all-solid state secondary battery, it is possible to realize an all-solid state secondary battery in which the discharge capacity is improved and a favorable output characteristic is exhibited. Furthermore, according to the methods for manufacturing an electrode sheet for an all-solid state secondary battery and an all-solid state secondary battery of the present invention, it is possible to manufacture an electrode sheet for an all-solid state secondary battery and an all-solid state secondary battery which have the above-described excellent performance.

DESCRIPTION OF THE PREFERRED EMBODIMENTS

An all-solid state secondary battery of the present invention includes a positive electrode active material layer, a negative electrode active material layer, and an inorganic solid electrolyte layer.

In the present invention, an electrode active material layer is formed using a material for an electrode including an active material, a sulfide-based inorganic solid electrolyte having conductivity for ions of metal elements belonging to Group I or II of the periodic table, and an auxiliary conductive agent having at least one metal atom belonging to Group XII, XIII, or XIV of the periodic table, in which the specific surface area of the auxiliary conductive agent is 1 to 500 m$^2$/g, and the ratio between the major axis length and the minor axis length of a particle constituting the auxiliary conductive agent is 1.5 or more.

In the present specification, there will be cases in which a positive electrode active material layer and a negative electrode active material layer will be collectively referred to as an electrode layer or an electrode active material layer. In addition, electrode active materials that are used in the present invention are classified into a positive electrode active material that is added to a positive electrode active material layer and a negative electrode active material that is added to a negative electrode active material layer, and, in a case in which any one or both of the electrode active material layers will be simply referred to as an active material or an electrode active material.

Hereinafter, a preferred embodiment of the all-solid state secondary battery of the present invention will be described.

<All-Solid State Secondary Battery>

Figure 1:
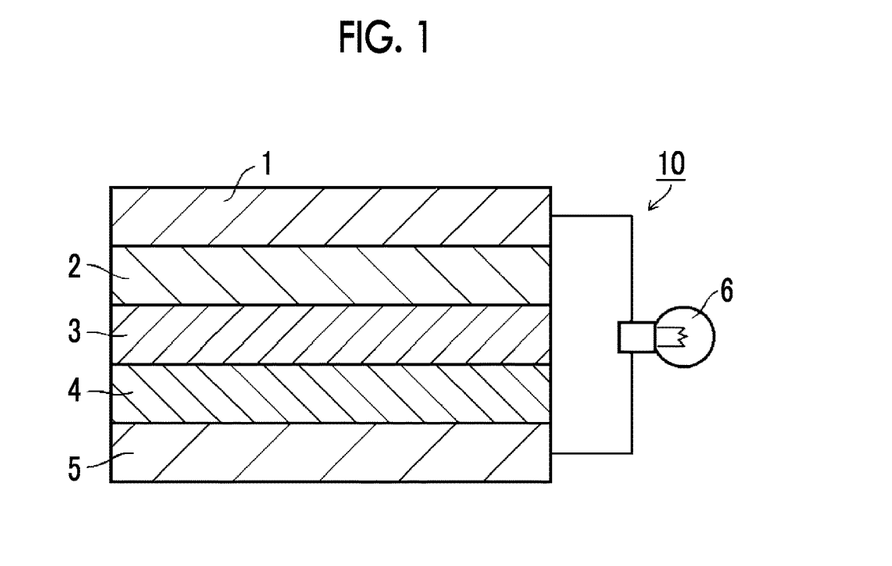
FIG. 1 is a vertical cross-sectional view schematically illustrating an all-solid state secondary battery according to a preferred embodiment of the present invention.

FIG. 1 is a cross-sectional view schematically illustrating a preferred embodiment of an all-solid state secondary battery (lithium ion secondary battery) specified by the present invention. An all-solid state secondary battery 10 that is obtained in the present embodiment has a structure formed by laminating a negative electrode collector 1, a negative electrode active material layer 2, a solid electrolyte layer 3, a positive electrode active material layer 4, and a positive electrode collector 5 in this order, and adjacent layers are in direct contact with each other. In a case in which the above-described structure is employed, during charging, electrons (e) are supplied to the negative electrode side, and lithium ions (Li$^+$) are accumulated on the negative electrode side. On the other hand, during discharging, the lithium ions (Li$^+$) accumulated on the negative electrode side return to the positive electrode, and electrons are supplied to an operation portion 6. In the example illustrated in the drawing, an electric bulb is employed as the operation portion 6 and is lit by discharging. Hereinafter, an all-solid state secondary battery having the layer constitution illustrated in FIG. 1 will also be referred to as an all-solid state secondary battery sheet in some cases.

The thicknesses of the positive electrode active material layer 4, the solid electrolyte layer 3, and the negative electrode active material layer 2 are not particularly limited. Meanwhile, in a case in which the dimensions of ordinary batteries are taken into account, the thicknesses of the respective layers described above are preferably 10 to 1,000 µm and more preferably 20 µm or more and less than 500 µm. In the all-solid state secondary battery of the present invention, the thickness of at least one layer of the positive electrode active material layer 4, the solid electrolyte layer 3, or the negative electrode active material layer 2 is still more preferably 50 µm or more and less than 500 µm.

—Material for Electrode—

Hereinafter, components contained in the material for an electrode of the present invention will be described.

The material for an electrode of the present invention is used as a material that forms an electrode active material layer in a secondary battery, preferably, an all-solid state secondary battery. The electrode active material layer that is formed of the material for an electrode of the present invention is not particularly limited, and the contained components are appropriately set depending on the target electrode active material layer. For example, as described below, it is possible to use a material for forming a positive electrode (a material for a positive electrode) or a material for forming a negative electrode (a material for a negative electrode).

The material for an electrode of the present invention can be used as a material for a positive electrode by adding a positive electrode active material to the material for an electrode. On the other hand, the material for an electrode of the present invention can be used as a material for a negative electrode by adding a negative electrode active material to the material for an electrode. The material for an electrode of the present invention is preferably a material for a positive electrode.

Hereinafter, the material for an electrode of the present invention containing a positive electrode active material will be referred to as a material for a positive electrode of the present invention. The material for a positive electrode of the present invention is preferably applied as a material forming a positive electrode active material layer constituting the all-solid state secondary battery of the present invention.

On the other hand, the material for an electrode of the present invention containing a negative electrode active material will be referred to as a material for a negative electrode of the present invention. The material for a negative electrode of the present invention is preferably applied as a material forming a negative electrode active material layer constituting the all-solid state secondary battery of the present invention.

The positive electrode active material layer in the all-solid state secondary battery of the present invention is preferably produced using the material for a positive electrode of the present invention, and the negative electrode active material layer in the all-solid state secondary battery of the present invention is preferably produced using the material for a negative electrode of the present invention.

—Positive Electrode Active Material—

A positive electrode active material that is used in the material for a positive electrode will be described. The positive electrode active material is preferably a positive electrode active material capable of reversibly intercalating and deintercalating lithium ions. The above-described material is not particularly limited and may be a transition metal oxide, an element that can be complexed with Li such as sulfur, or the like. Among these, a transition metal oxide is preferably used, and the transition metal oxide more preferably has one or more elements selected from Co, Ni, Fe, Mn, Cu, and V as a transition metal element.

Specific examples of the transition metal oxide include transition metal oxides having a bedded salt-type structure (MA), transition metal oxides having a spinel-type structure (MB), lithium-containing transition metal phosphoric acid compounds (MC), lithium-containing transition metal halogenated phosphoric acid compounds (MD), lithium-containing transition metal silicate compounds (ME), and the like.

Specific examples of the transition metal oxides having a bedded salt-type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compounds (MC) include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, and monoclinic nasicon-type vanadium phosphate salt such as $Li_3V_2(PO_4)_3$ (lithium vanadium phosphate).

Examples of the lithium-containing transition metal halogenated phosphoric acid compounds (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, $Li_2CoSiO_4$, and the like.

The shape of the positive electrode active material that is used in the present invention is not particularly limited, but is preferably particulate. The volume-average particle diameter (circle-equivalent average particle diameter) of the positive electrode active material that is used in the present invention is not particularly limited. For example, the volume-average particle diameter is preferably 0.1 µm to 50 µm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The volume-average particle diameter (circle-equivalent average particle diameter) of positive electrode active material particles can be measured using a laser diffraction/scattering-type particle size distribution measurement instrument LA-920 (trade name, manufactured by Horiba Ltd.).

The content of the positive electrode active material is not particularly limited, but is preferably 10% to 95% by mass and more preferably 20% to 90% by mass with respect to 100% by mass of the solid components in the material for a positive electrode.

The mass (mg) of the positive electrode active material per unit area ($cm^2$) of the positive electrode active material layer (the weight per unit area) is not particularly limited and can be randomly determined depending on the set battery capacity.

The positive electrode active material may be used singly or two or more positive electrode active materials may be used in combination.

—Negative Electrode Active Material—

Hereinafter, a negative electrode active material that is used in the material for a negative electrode of the present invention will be described.

The negative electrode active material is preferably a negative electrode active material capable of reversibly intercalating and deintercalating lithium ions. The above-described material is not particularly limited, and examples thereof include carbonaceous materials, oxides such as tin oxide and silicon oxide, metal complex oxides, a lithium single body or lithium alloys such as lithium aluminum alloys, metals capable of forming an alloy with lithium such as Sn, Si, and In, and the like. Among these, carbonaceous materials or metal complex oxides are preferably used in terms of reliability. In addition, the metal complex oxides are preferably capable of absorbing and deintercalating lithium. The material is not particularly limited, but preferably contains titanium and/or lithium as constituent components from the viewpoint of high-current density charging and the discharging characteristic.

The carbonaceous material that is used as the negative electrode active material is a material substantially consisting of carbon. Examples thereof include petroleum pitch, natural graphite, artificial graphite such as highly oriented pyrolytic graphite, and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, glassy carbon fibers, and active carbon fibers, mesophase microspheres, graphite whisker, flat graphite, and the like.

These carbonaceous materials can be classified into hardly graphitizable carbonaceous materials and graphite-based carbonaceous materials depending on the degree of graphitization. In addition, the carbonaceous material preferably has the surface separation or the density and the size of crystallites described in JP1987-22066A (JP-S62-22066A), JP1990-6856A (JP-H2-6856A), and JP1991-45473A (JP-H3-45473A). The carbonaceous material does not need to be a single material, and it is also possible to use the mixture of a natural graphite and an artificial graphite described in JP1993-90844A (JP-H5-90844A), graphite having a coating layer described in JP1994-4516A (JP-H6-4516A), and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines. The highest intensity in the crystalline diffraction line appearing at the 2θ value of 40° or more and 70° or less is preferably 100 times or less and more preferably five times or less of the diffraction line intensity at the peak of the broad scattering line appearing at the 2θ value of 20° or more and 40° or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides consisting of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. In addition, these amorphous oxides may be complex oxides with lithium oxide, for example, $Li_2SnO_2$.

The shape of the negative electrode active material is not particularly limited, but is preferably particulate. The average particle size of the negative electrode active material is preferably 0.1 μm to 60 μm. In order to provide a predetermined particle size, an ordinary crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind power classifier, or the like depending on the necessity. Both of dry-type classification and wet-type classification can be carried out.

The content of the negative electrode active material is not particularly limited, but is preferably 10 to 95% by mass and more preferably 20 to 90% by mass with respect to 100% by mass of the solid components in the material for a negative electrode of the present invention.

The mass (mg) of the negative electrode active material per unit area ($cm^2$) of the negative electrode active material layer (the weight per unit area) is not particularly limited and can be randomly determined depending on the set battery capacity.

The negative electrode active material may be used singly or two or more negative electrode active materials may be used in combination.

—Inorganic Solid Electrolyte—

The inorganic solid electrolyte is an inorganic solid electrolyte, and the solid electrolyte refers to a solid-form electrolyte capable of migrating ions therein. The inorganic solid electrolyte is clearly differentiated from organic solid electrolytes (macromolecular electrolytes represented by polyethylene oxide (PEO) or the like and organic electrolyte salts represented by lithium bis(trifluoromethanesulfonyl) imide (LiTFSI)) since the inorganic solid electrolyte does not include any organic substances as a principal ion-conductive material. In addition, the inorganic solid electrolyte is a solid in a static state and is thus, generally, not disassociated or liberated into cations and anions. Due to this fact, the inorganic solid electrolyte is also clearly differentiated from inorganic electrolyte salts of which cations and anions are disassociated or liberated in electrolytic solutions or polymers ($LiPF_6$, $LiBF_4$, LiFSI, LiCl, and the like). The inorganic solid electrolyte is not particularly limited as long as the inorganic solid electrolyte has ion conductivity for ions of metals belonging to Group I or II of the periodic table (hereinafter, also referred to as the ion conductivity of metal) and is generally a substance not having electron conductivity.

In the present invention, the inorganic solid electrolyte is an inorganic solid electrolyte having ion conductivity for ions of metals belonging to Group I or II of the periodic table (that is, an inorganic solid electrolyte capable of conducting ions of metals belonging to Group I or II of the periodic table). Typical examples of the inorganic solid electrolyte include sulfide-based inorganic solid electrolytes and oxide-based inorganic solid electrolytes. In the present invention, sulfide-based inorganic solid electrolytes are used. Hereinafter, sulfide-based inorganic solid electrolytes will also be simply referred to as inorganic solid electrolytes.

—Sulfide-Based Inorganic Solid Electrolytes—

Sulfide-based inorganic solid electrolytes are preferably inorganic solid electrolytes which contain sulfur atoms (S), have ion conductivity of metals belonging to Group I or II of the periodic table, and have electron-insulating properties. The sulfide-based inorganic solid electrolytes are preferably inorganic solid electrolytes which, as elements, contain at least Li, S, and P and have a lithium ion conductivity, but the sulfide-based inorganic solid electrolytes may also include elements other than Li, S, and P depending on the purposes or cases.

Examples thereof include lithium ion-conductive inorganic solid electrolytes satisfying a composition represented by Formula (1).

$$L_{a1}M_{b1}P_{c1}S_{d1}A_{e1} \quad (1)$$

In Formula (1), L represents an element selected from Li, Na, and K and is preferably Li.

M represents an element selected from B, Zn, Sn, Si, Cu, Ga, Sb, Al, and Ge. Among these, M is preferably B, Sn, Si, Al, or Ge and more preferably Sn, Al, or Ge. A represents I, Br, Cl, or F and is preferably I or Br and particularly preferably I. a1 to e1 represent the compositional ratios among the respective elements, and a1:b1:c1:d1:e1 satisfies 1 to 12:0 to 1:1:2 to 12:0 to 5. a1 is preferably 1 to 9 and more preferably 1.5 to 4. b1 is preferably 0 to 0.5. d1 is preferably 3 to 7 and more preferably 3.25 to 4.5. Furthermore, e1 is preferably 0 to 3 and more preferably 0 to 1.

In Formula (1), the compositional ratios among L, M, P, S, and A are preferably b1=0 and e1=0, more preferably b1=0, e1=0, and the ratio among a1, c1, and d1 is 1 to 9:1:3 to 7, and still more preferably b1=0, e1=0, and a1:c1:d1=1.5 to 4:1:3.25 to 4.5. The compositional ratios among the respective elements can be controlled by adjusting the amounts of raw material compounds blended to manufacture the sulfide-based solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of [1]lithium sulfide (Li$_2$S) and phosphorus sulfide (for example, diphosphorus pentasulfide (P$_2$S$_5$)), [2] lithium sulfide and at least one of a phosphorus single body or a sulfur single body, or [3]lithium sulfide, phosphorus sulfide (for example, diphosphorus pentasulfide (P$_2$S$_5$)), and at least one of a phosphorus single body or a sulfur single body.

The ratio between Li$_2$S and P$_2$S$_5$ in Li—P—S-based glass and Li—P—S-based glass ceramic is preferably 65:35 to 85:15 and more preferably 68:32 to 77:23 in terms of the molar ratio between Li$_2$S:P$_2$S$_5$. In a case in which the ratio between Li$_2$S and P$_2$S$_5$ is set in the above-described range, it is possible to further increase the lithium ion conductivity. Specifically, the lithium ion conductivity can be preferably set to $1\times10^{-4}$ S/cm or more and more preferably set to $1\times10^{-3}$ S/cm or more. The upper limit is not particularly limited, but realistically $1\times10^{-1}$ S/cm or less.

Specific examples of the compound include compounds formed using a raw material composition containing, for example, Li$_2$S and a sulfide of an element of Groups XIII to XV. Specific examples thereof include Li$_2$S—P$_2$S$_5$, Li$_2$S—LiI—P$_2$S$_5$, Li$_2$S—LiI—Li$_2$O—P$_2$S$_5$, Li$_2$S—LiBr—P$_2$S$_5$, Li$_2$S—Li$_2$O—P$_2$S$_5$, Li$_2$S—Li$_3$PO$_4$—P$_2$S$_5$, Li$_2$S—P$_2$S$_5$—P$_2$O$_5$, Li$_2$S—P$_2$S$_5$—SiS$_2$, Li$_2$S—P$_2$S$_5$—SnS, Li$_2$S—P$_2$S$_5$—Al$_2$S$_3$, Li$_2$S—GeS$_2$, Li$_2$S—GeS$_2$—ZnS, Li$_2$S—Ga$_2$S$_3$, Li$_2$S—GeS$_2$—Ga$_2$S$_3$, Li$_2$S—GeS$_2$—P$_2$S$_5$, Li$_2$S—GeS$_2$—Sb$_2$S$_5$, Li$_2$S—GeS$_2$—Al$_2$S$_3$, Li$_2$S—SiS$_2$, Li$_2$S—Al$_2$S$_3$, Li$_2$S—SiS$_2$—Al$_2$S$_3$, Li$_2$S—SiS$_2$—P$_2$S$_5$, Li$_2$S—SiS$_2$—P$_2$S$_5$—LiI, Li$_2$S—SiS$_2$—LiI, Li$_2$S—SiS$_2$—Li$_4$SiO$_4$, Li$_2$S—SiS$_2$—Li$_3$PO$_4$, Li$_{10}$GeP$_2$S$_{12}$, and the like. Among these, crystalline and/or amorphous raw material compositions consisting of Li$_2$S—P$_2$S$_5$, Li$_2$S—GeS$_2$—Ga$_2$S$_3$, Li$_2$S—SiS$_2$—P$_2$S$_5$, Li$_2$S—SiS$_2$—Li$_4$SiO$_4$, Li$_2$S—SiS$_2$—Li$_3$PO$_4$, Li$_2$S—LiI—Li$_2$O—P$_2$S$_5$, Li$_2$S—Li$_2$O—P$_2$S$_5$, Li$_2$S—Li$_3$PO$_4$—P$_2$S$_5$, Li$_2$S—GeS$_2$—P$_2$S$_5$, and Li$_{10}$GeP$_2$S$_{12}$ are preferred due to their high lithium ion conductivity. Examples of a method for synthesizing sulfide-based inorganic solid electrolyte materials using the above-described raw material compositions include an amorphization method. Examples of the amorphization method include a mechanical milling method and a melting quenching method. Among these, the mechanical milling method is preferred. This is because treatments at normal temperature become possible, and it is possible to simplify manufacturing steps.

Crystalline sulfide-based inorganic solid electrolytes are harder than amorphous sulfide-based inorganic solid electrolytes, have a contact shape that is not easily deformed, and have a concern of voids remaining in the interface with the auxiliary conductive agent. Therefore, the sulfide-based inorganic solid electrolyte that is used in the present invention is preferably an amorphous sulfide-based inorganic solid electrolyte.

The volume-average particle diameter of the inorganic solid electrolyte is not particularly limited, but is preferably 0.01 μm or more and more preferably 0.1 μm or more. The upper limit is preferably 100 μm or less and more preferably 50 μm or less. Meanwhile, the shape of the inorganic solid electrolyte is preferably particulate, and the average particle diameter of the inorganic solid electrolyte particles is measured in the following order. One percent by mass of a dispersion liquid is diluted and prepared using the inorganic solid electrolyte particles and water (heptane in a case in which the inorganic solid electrolyte is unstable in water) in a 20 ml sample bottle. The diluted dispersion specimen is irradiated with 1 kHz ultrasonic waves for 10 minutes and is then immediately used for testing. Data capturing is carried out 50 times using this dispersion liquid specimen, a laser diffraction/scattering-type particle size distribution measurement instrument LA-920 (trade name, manufactured by Horiba Ltd.), and a silica cell for measurement at a temperature of 25° C., thereby obtaining the volume-average particle diameter. Regarding other detailed conditions and the like, the description of JIS Z8828:2013 "Particle size analysis-Dynamic light scattering method" is referred to as necessary. Five specimens are produced per level, and the average values thereof are employed.

When the satisfaction of both the battery performance and the interface resistance-reducing and maintaining effect is taken into account, the content of the inorganic solid electrolyte in the solid component in the material for an electrode is preferably 5% by mass or more, more preferably 10% by mass or more, and particularly preferably 20% by mass or more with respect to 100% by mass of the solid components. From the same viewpoint, the upper limit is preferably 99.9% by mass or less, more preferably 99.5% by mass or less, and particularly preferably 99% by mass or less.

Meanwhile, in the present specification, solid components refer to components that do not disappear due to volatilization or evaporation in the case of being dried at 170° C. for six hours and typically indicate components other than a dispersion medium described below.

The mass (mg) of the solid electrolyte per unit area (cm$^2$) of the solid electrolyte layer (the weight per unit area) is not particularly limited and can be randomly determined depending on the set battery capacity.

These inorganic solid electrolytes may be used singly or two or more inorganic solid electrolytes may be used in combination.

(Auxiliary Conductive Agent)

The material for an electrode of the present invention includes an auxiliary conductive agent. The auxiliary conductive agent that is used in the present invention has at least one metal atom belonging to Group XII, XIII, or XIV of the periodic table, has a specific surface area of 1 to 500 m$^2$/g, and has a ratio between the major axis length and the minor axis length (aspect ratio) of a particle constituting the auxiliary conductive agent of 1.5 or more.

In a case in which the auxiliary conductive agent that is used in the present invention has a metal atom belonging to Group XII, XIII, or XIV of the periodic table, it becomes possible to satisfy both a sufficient electron conductivity and procurement suitability such as costs.

The specific surface area of the auxiliary conductive agent that is used in the present invention is 1 to 500 m$^2$/g.

In a case in which the specific surface area of the auxiliary conductive agent exceeds 500 m$^2$/g, the specific weight of the auxiliary conductive agent becomes too small. Therefore, in a case in which an auxiliary conductive agent having the same mass and a specific surface area of more than 500 m$^2$/g is used, the volume occupied by the auxiliary conductive agent per unit volume of the electrode layer increases. As a result, the contact area between the electrode active material and the inorganic solid electrolyte becomes small, and the discharge capacity of the all-solid state secondary battery decreases.

On the other hand, in a case in which the specific surface area of the auxiliary conductive agent is less than 1 m$^2$/g, the volume occupied by the auxiliary conductive agent per unit volume of the electrode active material layer becomes small. As a result, the contact area between the electrode active material and the auxiliary conductive agent becomes small, and the output characteristic of the all-solid state secondary battery decreases.

The lower limit of the specific surface area of the auxiliary conductive agent that is used in the present invention is preferably 2 m$^2$/g or more and more preferably 3 m$^2$/g or more. Meanwhile, the upper limit is preferably 400 m$^2$/g or less, more preferably 300 m$^2$/g or less, more preferably 150 m$^2$/g or less, and still more preferably 100 m$^2$/g or less.

The specific surface area of the auxiliary conductive agent that is used in the present invention can be measured with reference to a measurement method described in the section of examples.

In a case in which the specific surface area is set to a specific value as described above, it is possible to prevent the degradation of the output characteristic and discharge capacity of the all-solid state secondary battery attributed to the content of the auxiliary conductive agent. In the present invention, an auxiliary conductive agent having a specific aspect ratio is employed in order for the additional improvement of the all-solid state secondary battery.

The aspect ratio of the particle constituting the auxiliary conductive agent that is used in the present invention is 1.5 or more. In a case in which the aspect ratio is less than 1.5, the continuous connection of the active material and the auxiliary conductive agent to an electron conduction path becomes insufficient, the electron conductivity in the electrode active material layer is low, and it is not possible to improve the output characteristic of the all-solid state secondary battery.

The upper limit of the aspect ratio of the particle constituting the auxiliary conductive agent that is used in the present invention is not particularly limited, but is preferably 10,000 or less, more preferably 5,000 or less, more preferably 1,000 or less, more preferably 500 or less, more preferably 300 or less, and still more preferably 100 or less. In a case in which the upper limit is equal to or less than the upper limit value, the dispersion in the active material layer is easy, and it is possible to efficiently prevent short circuits caused by the penetration of the auxiliary conductive agent through the active material layer.

The aspect ratio of the particle constituting the auxiliary conductive agent that is used in the present invention can be measured with reference to a measurement method described in the section of the examples.

The upper limit of the minor axis length of the particle constituting the auxiliary conductive agent that is used in the present invention is not particularly limited, but is preferably 10 μm or less, more preferably 8 μm or less, and particularly preferably 5 μm or less. Meanwhile, the lower limit of the minor axis length of the particle constituting the auxiliary conductive agent that is used in the present invention is not particularly limited, but is preferably 1 nm or more, more preferably 3 nm or more, and particularly preferably 5 nm or more.

In addition, the upper limit of the average value of the minor axis lengths of the particles constituting the auxiliary conductive agent that is used in the present invention is not particularly limited, but is preferably 8 μm or less, more preferably 5 μm or less, and particularly preferably 3 μm or less. Meanwhile, the lower limit of the average value of the minor axis lengths of the particles constituting the auxiliary conductive agent that is used in the present invention is not particularly limited, but is preferably 1 nm or more, more preferably 2 nm or more, and particularly preferably 3 nm or more.

Here, "the average value of the minor axis lengths of the particles constituting the auxiliary conductive agent" refers to the average value of the minor axis lengths in the auxiliary conductive agent excluding the top and bottom 10 percent of the minimum lengths (minor axis lengths) of 50 particles constituting the auxiliary conductive agent which are computed using the measurement method described in the section of the examples.

Meanwhile, the shape of the particle constituting the auxiliary conductive agent is not particularly limited as long as the above-described characteristic is satisfied; however, from the viewpoint of the prevention of peeling from solid particles and the ensuring of contact points with solid particles, for example, a needle shape, a tubular shape, a dumbbell shape, a disc shape, an elliptical shape or a spherical shape is preferred.

In a case in which the auxiliary conductive agent that is used in the present invention has a specific surface area of 1 to 500 m²/g and an aspect ratio of 1.5 or more, the active material and the auxiliary conductive agent sufficiently come into contact with each other, electron conduction paths can be efficiently formed, and it is possible to increase the electron conductivity in the electrode layer. Therefore, it is possible to increase both the discharge capacity and output characteristic of the all-solid state secondary battery without applying pressure. Furthermore, in a case in which the sulfide-based inorganic solid electrolyte is jointly used with an auxiliary conductive agent that does not satisfy the specifications of the present invention, the sulfide-based inorganic solid electrolyte and the auxiliary conductive agent do not sufficiently come into contact with each other, and it is not possible to obtain a sufficient electron conductivity in solid particle interfaces. However, in the present invention, the above-described advantages can be obtained by jointly using the above-described auxiliary conductive agent.

Here, "without applying pressure" means a case in which the all-solid state secondary battery is driven without applying pressure between the electrodes or a case in which the all-solid state secondary battery is driven under the application of a pressure of 1 MPa or less. Even in a case in which atmospheric pressure of 0.1 MPa or a pressure of atmospheric pressure or more (up to 1 MPa) is applied, such application of a pressure of 1 MPa or less is not considered as the pressurization as long as the pressurization is not intended for a treatment for forming a sheet of a battery (for example, a lamination treatment).

The auxiliary conductive agent that is used in the present invention is preferably an oxide since it is possible to expect the improvement of wettability through the coincidence of the surface property with the electrode active material and the oxide is highly stiff and is advantageous in the formation of electron conduction paths in the electrode active material layer.

Specific examples of the metal element belonging to Group XII, XIII, or XIV of the periodic table include Al, Zn, Cd, Ga, In, Ge, Sn, and Pb, and Zn, Cd, Ga, In, Ge, Sn, and Pb are preferred from the viewpoint of the sufficient electron conductivity, the procurement suitability such as costs, and the possibility of balanced electrochemical stability.

Meanwhile, these metals may be included in the material for an electrode of the present invention in an alloy form, and examples of the above-described alloy include alloys consisting of metal elements belonging to Group XII, XIII, or XIV of the periodic table.

The content of the auxiliary conductive agent in the material for an electrode of the present invention is not particularly limited, but is preferably 0.01% to 10% by mass, more preferably 0.05% to 8% by mass, still more preferably 0.1% to 7% by mass, still more preferably 0.1% to 3% by mass, still more preferably 0.1% to 2.5% by mass, and still more preferably 0.1% to 2.0% by mass with respect to 100% by mass of the solid components of the material for an electrode. This is because, in the above-described range, the electron conductivity in an electrode active material layer that is produced using the material for an electrode of the present invention is favorable, and it is possible to ensure the compositional ratio of the electrode active material in the electrode active material layer at a high level. Meanwhile, the content of the auxiliary conductive agent in the material for an electrode of the present invention may be set to 0.1% to 1.5% by mass and preferably set to 0.1% to 0.8% by mass with respect to 100% by mass of the solid components of the material for an electrode from the viewpoint of the discharge capacity.

As the auxiliary conductive agent that is used in the present invention, it is possible to use a commercially available product in which the specific surface area and the aspect ratio of the particle constituting the auxiliary conductive agent satisfy the above-described predetermined ranges. Specific examples thereof include FT-1000 (trade name, manufactured by Ishihara Sangyo Kaisha, Ltd., specific surface area: 15 m²/g, aspect ratio: 13), FT-2000 (trade name, manufactured by Ishihara Sangyo Kaisha, Ltd., specific surface area: 13 m²/g, aspect ratio: 14), FT-3000 (trade name, manufactured by Ishihara Sangyo Kaisha, Ltd., specific surface area: 5 m²/g, aspect ratio: 19), and FS-10P (trade name, manufactured by Ishihara Sangyo Kaisha, Ltd., specific surface area: 30 m²/g, aspect ratio: 70).

In addition, the auxiliary conductive agent that is used in the present invention can also be synthesized using an ordinary method.

—Dispersant—

The material for an electrode of the present invention may contain a dispersant.

In a case in which the material for an electrode contains a dispersant, the agglomeration of solid particles of the electrode active material and the like is suppressed, it is possible to form an electrode active material layer in which solid particles are uniformly dispersed, and contribution is made to the output improvement of the all-solid state secondary battery.

The dispersant preferably consists of a small molecule or an oligomer having a molecular weight of 200 or more and less than 3,000 and contains at least one functional group selected from the following group of functional groups (I) and an alkyl group having 8 or more carbon atoms or an aryl group having 10 or more carbon atoms in the same molecule.

Group of functional groups (I): acidic groups, groups having a basic nitrogen atom, a (meth)acryl group, a (meth)acrylamide group, an alkoxysilyl group, an epoxy group, an oxetanyl group, an isocyanate group, a cyano group, a thiol group, and a hydroxy group The molecular weight of the dispersant is more preferably 300 or more and less than 2,000 and particularly preferably 500 or more and less than 1,000. In a case in which the molecular weight is less than the upper limit value, particles do not easily agglomerate, and it is possible to effectively suppress a decrease of the output. In addition, in a case in which the molecular weight is equal to or more than the lower limit value, the dispersant does not easily volatilize in a stage of the application and drying of a solid electrolyte composition slurry for an all-solid state secondary battery.

Among the group of functional groups (I), acidic groups (for example, a carboxy group, a sulfonic acid group, and a phosphoric acid group), groups having a basic nitrogen atom (for example, an amino group), and a cyano group are preferred, and acidic groups are more preferred. Among acidic groups, a carboxy group is particularly preferred.

The particle dispersant has an alkyl group having 8 or more carbon atoms or an aryl group having 10 or more carbon atoms.

The alkyl group having 8 or more carbon atoms may be linear, branched, or cyclic as long as the total number of carbon atoms in the alkyl group is 8 or more and may contain a hetero atom between carbon-carbon bonds even in a case in which the alkyl group is not a carbon hydride. In addition, the alkyl group having 8 or more carbon atoms may be unsubstituted or may further have a substituent, and, in the case of further having a substituent, the substituent is preferably a halogen atom. Furthermore, the alkyl group may have an unsaturated carbon-carbon bond in the middle.

Examples of the halogen atom include a fluorine atom, a chlorine atom, a bromine atom, an iodine atom, and the like, and a fluorine atom is preferred.

The alkyl group having 8 or more carbon atoms is preferably an alkyl group having 8 or more and 50 or less carbon atoms, more preferably an alkyl group having 8 or more and 30 or less carbon atoms, still more preferably an alkyl group having 8 or more and 20 or less carbon atoms, and particularly preferably an alkyl group having 8 or more and 18 or less carbon atoms.

Specific examples thereof include a normal octyl group, a normal decyl group, a normal dodecyl group, a normal tetradecyl group, a normal hexadecyl group, a stearyl group, a lauryl group, a linole group, a linolen group, a 2-ethylhexyl group, a 2-ethyloctyl group, a 2-ethyldodecyl group, a polyethylene glycol monomethyl group, a perfluorooctyl group, a perfluorododecyl group, and the like.

Among these, a normal octyl group, a 2-ethylhexyl group, a normal nonyl group, a normal decyl group, a normal undecyl group, a normal dodecyl group, a normal tetradecyl group, or a normal octadecyl group (a stearyl group) is preferred.

In a case in which the alkyl group having 8 or more carbon atoms has a substituent, examples of the substituent include an aryl group having 6 or more carbon atoms such as a phenyl group or a naphthyl group, a halogen atom, and the like. For example, the alkyl group may be an alkyl group substituted with an aryl group or a halogenated alkyl group substituted with a halogen.

The aryl group having 10 or more carbon atoms needs to be an aryl group having 10 or more carbon atoms in total and may contain a hetero atom between carbon-carbon bonds even in a case in which the aryl group is not a carbon hydride. In addition, the aryl group having 10 or more carbon atoms may be unsubstituted or may further have a substituent, and, in the case of further having a substituent, the substituent is preferably a halogen atom.

The aryl group having 10 or more carbon atoms is preferably an aryl group having 10 or more and 50 or less carbon atoms, more preferably an aryl group having 10 or more and 30 or less carbon atoms, still more preferably an aryl group having 10 or more and 20 or less carbon atoms, and particularly preferably an aryl group having 10 or more and 18 or less carbon atoms.

Specific examples thereof include a naphthyl group, an anthracenyl group, a pyrenyl group, a terphenyl group, a naphthacenyl group, a pentacenyl group, a benzopyrenyl group, a chrysenyl group, a triphenylenyl group, a corannulenyl group, a coronenyl group, an ovalenyl group, and the like.

Among these, a condensed ring-type aromatic hydrocarbon group is preferred.

In a case in which the aryl group having 10 or more carbon atoms has a substituent, examples of the substituent include an alkyl group having 8 or more carbon atoms such as a normal octyl group, a halogen atom, and the like. For example, the aryl group may be an aryl group substituted into an alkyl group.

A particularly preferred combination is a combination having a carboxy group and an alkyl group having 8 or more carbon atoms in the same molecule, and, specifically, a long-chain saturated fatty acid and a long-chain unsaturated fatty acid can be more preferably used.

A combination having two or more groups represented by the group of functional groups (I) and two or more alkyl groups having 8 or more carbon atoms or two or more aryl groups having 10 or more carbon atoms in the same molecule is more preferred.

The content of the dispersant is not particularly limited, but is preferably 0.01% to 20% by mass and more preferably 0.1% to 10% by mass with respect to 100% by mass of the solid components of the material for an electrode.

—Lithium Salt—

The material for an electrode of the present invention also preferably contains a lithium salt.

The lithium salt is preferably a lithium salt that is generally used in this kind of product and is not particularly limited. For example, the lithium salt described in Paragraphs 0082 to 0085 of JP2015-088486A is preferred.

The content of the lithium salt is preferably 0 parts by mass or more and more preferably 5 parts by mass or more with respect to 100 parts by mass of the inorganic solid electrolyte. The upper limit is preferably 50 parts by mass or less and more preferably 20 parts by mass or less.

—Binder—

The material for an electrode of the present invention may also contain a binder.

The binder that is used in the present invention is not particularly limited as long as the binder is an organic polymer.

The binder that can be used in the present invention is preferably a binder that is generally used as binding agents for positive electrodes or negative electrodes of battery materials, is not particularly limited, and is preferably, for example, a binder consisting of resins described below.

Examples of fluorine-containing resins include polytetrafluoroethylene (PTFE), polyvinylene difluoride (PVdF), and copolymers of polyvinylene difluoride and hexafluoropropylene (PVdF-HFP).

Examples of hydrocarbon-based thermoplastic resins include polyethylene, polypropylene, styrene butadiene rubber (SBR), hydrogenated styrene butadiene rubber (HSBR), butylene rubber, acrylonitrile butadiene rubber, polybutadiene, and polyisoprene.

Examples of acrylic resins include polymethyl (meth)acrylate, polyethyl (meth)acrylate, polyisopropyl (meth)acrylate, polyisobutyl (meth)acrylate, polybutyl (meth)acrylate, polyhexyl (meth)acrylate, polyoctyl (meth)acrylate, polydodecyl (meth)acrylate, polystearyl (meth)acrylate, poly 2-hydroxyethyl (meth)acrylate, poly(meth)acrylate, polybenzyl (meth)acrylate, polyglycidyl (meth)acrylate, polydimethylaminopropyl (meth)acrylate, and copolymers of monomers constituting the above-described resins.

In addition, copolymers with other vinyl-based monomers are also preferably used. Examples thereof include polymethyl (meth)acrylate-polystyrene copolymers, polymethyl (meth)acrylate-acrylonitrile copolymers, and polybutyl (meth)acrylate-acrylonitrile-styrene copolymers.

These binders may be used singly or two or more binders may be used in combination.

The moisture concentration of a polymer constituting the binder that is used in the present invention is preferably 100 ppm or less (mass-based).

In addition, the polymer constituting the binder that is used in the present invention may be dried by being crystallized or may be used in a polymer solution form. The amount of a metal-based catalyst (an urethanization or polyesterification catalyst=tin, titanium, or bismuth) is preferably small. The concentration of metal in copolymers is preferably 100 ppm or less (mass-based).

The mass average molecular weight of the polymer constituting the binder that is used in the present invention is preferably 10,000 or more, more preferably 20,000 or more, and still more preferably 50,000 or more. The upper limit is preferably 1,000,000 or less, more preferably 200,000 or less, and still more preferably 100,000 or less.

In a case in which favorable interface resistance-reducing and maintaining properties are taken into account when the binder is used in all-solid state secondary batteries, the concentration of the binder in the material for an electrode is preferably 0.01% by mass or more, more preferably 0.1% by mass or more, and still more preferably 1% by mass or more with respect to 100% by mass of the solid components. From the viewpoint of battery characteristics, the upper limit is preferably 10% by mass or less, more preferably 5% by mass or less, and still more preferably 3% by mass or less.

In the present invention, the mass ratio [(the mass of the inorganic solid electrolyte and the mass of the active materials)/the mass of the binder] of the total mass (total amount) of the inorganic solid electrolyte and the active materials to the mass of the binder is preferably in a range of 1,000 to 1. This ratio is more preferably 500 to 2 and still more preferably 100 to 10.

(Dispersion Medium)

The material for an electrode of the present invention may also contain a dispersion medium that disperses the respective components described above. Specific examples of the dispersion medium include dispersion media described below.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, diethylene glycol monobutyl ether, and the like), dimethyl ether, diethyl ether, diisopropyl ether, dibutyl ether, tetrahydrofuran, and dioxane.

Examples of amide compound solvents include N,N-dimethylformamide, 1-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, hexamethylphosphoric triamide, and the like.

Examples of amino compound solvents include triethylamine, diisopropylethylamine, tributylamine, and the like.

Examples of ketone compound solvents include acetone, methyl ethyl ketone, methyl isobutyl ketone, and cyclohexanone.

Examples of aromatic compound solvents include benzene, toluene, xylene, and the like.

Examples of aliphatic compound solvents include hexane, heptane, octane, decane, and the like.

Examples of nitrile compound solvents include acetonitrile, propionitrile, isobutyronitrile, and the like.

Examples of non-aqueous dispersion media include the aromatic compound solvents, the aliphatic compound solvents, and the like.

The boiling points of the dispersion medium at normal pressure (one atmosphere) are preferably 50° C. or higher and more preferably 70° C. or higher. The upper limit is preferably 250° C. or lower and more preferably 220° C. or lower. One kind of the dispersion medium may be used singly or two or more kinds of the dispersion media may be used in combination.

In the present invention, among these, the nitrile compound solvents, the aromatic compound solvents, and the aliphatic compound solvents are preferred, and isobutyronitrile and heptane are more preferred.

The content of the dispersion medium is preferably 10 to 10,000 parts by mass, more preferably 30 to 5,000 parts by mass, and still more preferably 50 to 1,000 parts by mass with respect to 100 parts by mass of the total mass of the material for an electrode.

—Solid Electrolyte Composition—

Hereinafter, a solid electrolyte composition that is preferably applied as a material forming the solid electrolyte layer constituting the all-solid state secondary battery of the present invention will be described.

The solid electrolyte composition contains the inorganic solid electrolyte and may also contain the dispersant, the lithium salt, the binder, and the dispersion medium. Meanwhile, the solid electrolyte composition may contain an oxide-based inorganic solid electrolyte instead of the sulfide-based inorganic solid electrolyte.

The content of the dispersant is preferably 0 parts by mass or more and more preferably 0.01 parts by mass or more with respect to 100 parts by mass of the inorganic solid electrolyte. The upper limit is preferably 50 parts by mass or less and more preferably 20 parts by mass or less.

The content of the lithium salt is preferably 0 parts by mass or more and more preferably 5 parts by mass or more with respect to 100 parts by mass of the inorganic solid electrolyte. The upper limit is preferably 50 parts by mass or less and more preferably 20 parts by mass or less.

In a case in which favorable interface resistance-reducing and maintaining properties are taken into account when the binder is used in the all-solid state secondary battery, the content of the binder in the solid electrolyte composition is preferably 0.01% by mass or more, more preferably 0.1% by mass or more, and still more preferably 1% by mass or more with respect to 100% by mass of the solid components. From the viewpoint of battery characteristics, the upper limit is preferably 10% by mass or less, more preferably 5% by mass or less, and still more preferably 3% by mass or less.

In the present invention, the mass ratio [the mass of the inorganic solid electrolyte/the mass of the binder] of the total mass (total amount) of the inorganic solid electrolyte to the mass of the binder is preferably in a range of 1,000 to 1. This ratio is more preferably 500 to 2 and still more preferably 100 to 10.

The content of the dispersion medium is preferably 10 to 10,000 parts by mass, more preferably 30 to 5,000 parts by mass, and still more preferably 50 to 1,000 parts by mass with respect to 100 parts by mass of the total mass of the solid electrolyte composition.

(Moisture Content of Solid Electrolyte Composition)

The moisture contents of the material for an electrode or the solid electrolyte composition of the present invention, that is, the moisture content as the material for an electrode or the solid electrolyte composition containing the dispersion medium is preferably 50 ppm or less, more preferably 40 ppm or less, and still more preferably 30 ppm or less. The lower limit value of the moisture content is not particularly limited, but is realistically 0.001 ppm or more.

Meanwhile, the moisture contents of the material for an electrode and the solid electrolyte composition can be measured using the Karl Fischer method. As the measurement instrument, for example, a moisture meter CA-200 (trade name, manufactured by Mitsubishi Chemical Analytech Co., Ltd.) can be used, and, as the Karl Fischer solution, AQUA-MICRON AX (trade name, manufactured by Mitsubishi Chemical Corporation) can be used.

The moisture content in the above-described preferred range enables the suppression of reactions between a sulfide-based inorganic solid electrolyte and water in a case in which the sulfide-based inorganic solid electrolyte is used as the inorganic solid electrolyte.

<Collector (Metal Foil)>

The collectors of positive and negative electrodes are preferably electron conductors. The collector of the positive electrode is preferably a collector obtained by treating the surface of an aluminum or stainless steel collector with carbon, nickel, titanium, or silver in addition to an aluminum collector, a stainless steel collector, a nickel collector, a titanium collector, or the like, and, among these, an aluminum collector and an aluminum alloy collector are more preferred. The collector of the negative electrode is preferably an aluminum collector, a copper collector, a stainless steel collector, a nickel collector, or a titanium collector and more preferably an aluminum collector, a copper collector, or a copper alloy collector.

Regarding the shape of the collector, generally, collectors having a film sheet-like shape are used, but it is also possible to use net-shaped collectors, punched collectors, compacts of lath bodies, porous bodies, foaming bodies, or fiber groups, and the like.

The thickness of the collector is not particularly limited, but is preferably 1 μm to 500 μm. In addition, the surface of the collector is preferably provided with protrusions and recesses by means of a surface treatment.

<Production of All-Solid State Secondary Battery>

The all-solid state secondary battery can be produced using an ordinary method. Specific examples thereof include a method in which the material for an electrode of the present invention is applied onto a metal foil which serves as the collector, thereby producing an electrode sheet for an all-solid state secondary battery on which a coated film is formed.

For example, a material for a positive electrode is applied onto a metal foil which is a positive electrode collector so as to form a positive electrode active material layer, and a positive electrode sheet for an all-solid state secondary battery is produced. A solid electrolyte composition for forming a solid electrolyte layer is applied onto the positive electrode active material layer so as to form a solid electrolyte layer. Furthermore, a material for a negative electrode is applied onto the solid electrolyte layer so as to form a negative electrode active material layer. A negative electrode-side collector (metal foil) is overlaid on the negative electrode active material layer, whereby it is possible to obtain an all-solid state secondary battery having a structure illustrated in FIG. 1 in which the solid electrolyte layer is sandwiched between the positive electrode active material layer and the negative electrode active material layer.

In the all-solid state secondary battery of the present invention, the electrode layers contain active materials. From the viewpoint of improving ion conductivity, the electrode layers preferably contain the inorganic solid electrolyte. In addition, from the viewpoint of improving the bonding properties between solid particles, between the electrode active material layer and the solid electrolyte layer, and between the electrode and the collector, the electrode layers preferably contain a binder.

The solid electrolyte layer contains the inorganic solid electrolyte. From the viewpoint of improving the bonding properties between solid particles and between layers, the solid electrolyte layer preferably contains a binder.

Meanwhile, the material for an electrode and the solid electrolyte composition can be applied using an ordinary method. At this time, the material for a positive electrode for forming the positive electrode active material layer, the solid electrolyte composition for forming the inorganic solid electrolyte layer, and the material for a negative electrode for forming the negative electrode active material layer may be dried after being applied respectively or may be dried after being applied to multiple layers. The drying temperature is not particularly limited. Meanwhile, the lower limit is preferably 30° C. or higher and more preferably 60° C. or higher, and the upper limit is preferably 300° C. or lower and more preferably 250° C. or lower. In a case in which the compositions are heated in the above-described temperature range, it is possible to remove the dispersion medium and form a solid state.

<Usages of All-Solid State Secondary Battery>

The all-solid state secondary battery according to the present invention can be applied to a variety of usages. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, backup power supplies, and the like. Additionally, examples of consumer usages include automobiles, electric vehicles, motors, lighting equipment, toys, game devices, road conditioners, watches, strobes, cameras, medical devices (pacemakers, hearing aids, shoulder massage devices, and the like), and the like. Furthermore, the all-solid state secondary battery can be used for a variety of military usages and universe usages. In addition, the all-solid state secondary battery can also be combined with solar batteries.

Among these, the all-solid state secondary battery is preferably applied to applications for which a high capacity and a high-rate discharging characteristic are required. For example, in electricity storage facilities in which an increase in the capacity is expected in the future, it is necessary to satisfy both high reliability, which is essential, and furthermore, the battery performance. In addition, in electric vehicles mounting high-capacity secondary batteries and domestic usages in which batteries are charged out every day, better reliability is required against overcharging. According to the present invention, it is possible to preferably cope with the above-described use aspects and exhibit excellent effects.

According to the preferred embodiment of the present invention, individual application forms as described below are derived.

(1) A material for a positive electrode containing a binder.
(2) An electrode sheet for an all-solid state secondary battery obtained by applying the material for a positive electrode onto a metal foil and forming a positive electrode active material layer.
(3) An electrode sheet for an all-solid state secondary battery obtained by applying the material for a positive electrode onto a metal foil so as to form a positive electrode active material layer, applying a solid electrolyte composition onto the positive electrode active material layer so as to form a solid electrolyte layer, and applying a material for a negative electrode onto the solid electrolyte layer so as to form a negative electrode active material layer.

(4) A method for manufacturing an electrode sheet for an all-solid state secondary battery in which the material for a positive electrode is applied onto a metal foil so as to form a film.

(5) A method for manufacturing an all-solid state secondary battery in which an electrode active material layer is formed by the wet-type application of a slurry obtained by dispersing a sulfide-based inorganic solid electrolyte using a dispersion medium.

Meanwhile, examples of methods for applying the material for an electrode or the solid electrolyte composition onto a metal foil include coating (preferably wet-type coating), spray coating, spin coating, dip coating, slit coating, stripe coating, and bar coating.

All-solid state secondary batteries refer to secondary batteries having a positive electrode, a negative electrode, and an electrolyte which are all constituted of solid. In other words, all-solid state secondary batteries are differentiated from electrolytic solution-type secondary batteries in which a carbonate-based solvent is used as an electrolyte. Among these, the present invention is assumed to be an inorganic all-solid state secondary battery. All-solid state secondary batteries are classified into organic (high-molecular-weight) all-solid state secondary batteries in which a high-molecular-weight compound such as polyethylene oxide is used as an electrolyte and inorganic all-solid state secondary batteries in which Li—P—S or the like is used. Meanwhile, the application of high-molecular-weight compounds to inorganic all-solid state secondary batteries is not inhibited, and high-molecular-weight compounds can also be applied as binders of positive electrode active materials, negative electrode active materials, and inorganic solid electrolyte particles.

Inorganic solid electrolytes are differentiated from electrolytes in which the above-described high-molecular-weight compound is used as an ion conductive medium (high-molecular-weight electrolyte), and inorganic compounds serve as ion conductive media. Specific examples thereof include Li—P—S. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, in the case of being differentiated from electrolytes as the ion transportation materials, the materials are referred to as "electrolyte salts" or "supporting electrolytes". Examples of the electrolyte salts include lithium bistrifluoromethanesulfonylimide (LiTFSI).

In the present invention, "a material for an electrode" or "a composition" refers to a mixture obtained by uniformly mixing two or more components. Here, compositions may partially include agglomeration or uneven distribution as long as the compositions substantially maintain uniformity and exhibit desired effects.

EXAMPLES

Hereinafter, the present invention will be described in more detail on the basis of examples. Meanwhile, the present invention is not interpreted to be limited thereto. In the following examples, "parts" and "%" are mass-based unless particularly otherwise described. In addition, "room temperature" is 25° C.

—Method for Measuring Specific Surface Area of Auxiliary Conductive Agent—

The specific surface area of an auxiliary conductive agent was measured using a specific surface area measurement device BELSORP-mini (trade name, BEL JAPAN K.K.). The absorption and desorption isothermal line was measured using a constant capacity method, and the specific surface area (BET) was computed.

—Method for Measuring Aspect Ratio of Particle Constituting Auxiliary Conductive Agent—

The aspect ratio of a particle constituting the auxiliary conductive agent was measured as described below by processing an electron microscopic image.

SEM images of three random views captured using a scanning electron microscope (SEM) (XL30 manufactured by Koninklijke Philips N.V. (trade name)) at a magnification of 1,000 to 3,000 times were converted to bitmap (BMP) files, images of 50 particles of the auxiliary conductive agent were imported using "A JOUKUN" which was an integrated application of IP-1000PC (trade name) manufactured by Asahi Kasei Engineering Corporation, the maximum value and the minimum value of the lengths of the respective particles were scanned in a state in which the particles were visible in the images without being overlapped, and the aspect ratio was computed in the following order. "The maximum value of the lengths of the particles" refers to the maximum value of distances from one point to another point on the outer circumference of a particle. On the other hand, "the minimum value of the lengths of the particles" refers to the minimum value of the lengths of lines which connect one point to another point on the outer circumference of a particle and are orthogonal to the line exhibiting the above-described maximum value.

Among the maximum values (major axis lengths) of the 50 particles, the average value (A) of 40 maximum values excluding the top and bottom five maximum values was obtained. Next, among the minimum values (minor axis lengths) of the 50 particles, the average value (B) of 40 minimum values excluding the top and bottom five minimum values was obtained. The average value (A) was divided by the average value (B), thereby computing the aspect ratio.

—Synthesis of Auxiliary Conductive Agent—

Synthesis Example 1

A 10% isopropanol/toluene liquid mixture of tin (IV) tetraisopropoxide (50 mL) and triethanolamine (4.2 g) were injected into a pressure-resistant container at room temperature and mixed together. Subsequently, an aqueous solution of 1 N sodium hydroxide was added dropwise little by little to the pressure-resistant container, thereby setting the pH of the liquid to 11.2. Subsequently, the liquid was heated to 100° C., held at 100° C. for 24 hours, then, heated to 140° C., and held at 140° C. for 72 hours. The obtained sol was dried and then fired at 400° C. and atmospheric pressure for four hours, thereby obtaining an auxiliary conductive agent (sample A). The specific surface area was 55 m$^2$/g, the average value of the minor axis lengths was 25 nm, and the aspect ratio was 15.

Synthesis Example 2

An auxiliary conductive agent (sample B) was obtained in the same manner as in Synthesis Example 1 except for the fact that ethylenediamine (0.3 g) was added in addition to the 10% isopropanol/toluene liquid mixture of tin (IV)

tetraisopropoxide (50 mL) and triethanolamine (4.2 g). The specific surface area was 65 m²/g, the average value of the minor axis lengths was 23 nm, and the aspect ratio was 18.

Synthesis Example 3

Tin oxalate dehydrate (0.5 g), polyvinylpyrrolidone (2.5 g), and ethylene glycol (110 mL) were added to a 500 mL three-neck flask and stirred at room temperature. After the polyvinylpyrrolidone was dissolved, the solution was heated to 195° C. and stirred for three hours. After that, the solution was cooled to room temperature, centrifugally separated using a centrifugal separator (manufactured by Tomy Seiko Co., Ltd., trade name: MX-305) under conditions of a rotation speed of 10,000 rpm and 15 minutes, and the deposit was collected. The obtained deposit was washed with ethanol, dried, then, moved to a pressure-resistant container, and fired at 500° C. and atmospheric pressure for one hour, thereby obtaining an auxiliary conductive agent (sample C). The specific surface area was 80 m²/g, the average value of the minor axis lengths was 50 nm, and the aspect ratio was 25.

Synthesis Example 4

An auxiliary conductive agent (sample D) was obtained in the same manner as in Synthesis Example 3 except for the fact that polyvinylpyrrolidone (1.0 g) was used and the firing was carried out at 900° C. in the atmosphere for 15 hours. The specific surface area was 0.9 m²/g, the average value of the minor axis lengths was 800 nm, and the aspect ratio was 5.

The samples A to C were auxiliary conductive agents satisfying the specifications of the present invention, and the sample D was an auxiliary conductive agent for comparison.

—Synthesis of Sulfide-Based Inorganic Solid Electrolyte (Li—P—S-Based Glass)—

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a glove box under an argon atmosphere (dew point: −70° C.), lithium sulfide (Li$_2$S, manufactured by Aldrich-Sigma, Co. LLC. Purity: >99.98%) (2.42 g) and diphosphorus pentasulfide (P$_2$S$_5$, manufactured by Aldrich-Sigma, Co. LLC. Purity: >99%) (3.90 g) were respectively weighed, injected into an agate mortar, and mixed using the agate mortar for five minutes. Meanwhile, the molar ratio between Li$_2$S and P$_2$S$_5$ was set to 75:25.

66 zirconia beads having a diameter of 5 mm were injected into a 45 mL zirconia container (manufactured by Fritsch Japan Co., Ltd.), the full amount of the mixture of the lithium sulfide and the diphosphorus pentasulfide was injected thereinto, and the container was completely sealed in an argon atmosphere. The container was set in a planetary ball mill P-7 (trade name) manufactured by Fritsch Japan Co., Ltd., mechanical milling was carried out at a temperature of 25° C. and a rotation speed of 510 rpm for 20 hours, thereby obtaining yellow powder (6.20 g) of a sulfide solid electrolyte material (Li—P—S-based glass).

Examples and Comparative Examples

Materials for an electrode, solid electrolyte compositions, electrode sheets for an all-solid state secondary battery, and all-solid state secondary batteries were produced as described below.

—Preparation of Material for Positive Electrode (P-1)—

180 zirconia beads having a diameter of 5 mm were injected into a 45 mL zirconia container (manufactured by Fritsch Japan Co., Ltd.), and the LI—P—S-based glass synthesized above (3.0 g) and heptane (12.3 g) as a dispersion medium were injected thereinto. The container was set in a planetary ball mill P-7 (trade name, manufactured by Fritsch Japan Co., Ltd.), and the components were mixed at a temperature of 25° C. and a rotation speed of 300 rpm for two hours. After that, LiCoO2 (LCO, manufactured by Ishihara Sangyo Kaisha, Ltd.) (6.8 g) as an active material and FT-1000 (trade name, manufactured by Ishihara Sangyo Kaisha, Ltd.) (0.2 g) as an auxiliary conductive agent were injected into the container, similarly, the container was set in the planetary ball mill P-7, and the components were continuously mixed at a temperature of 25° C. and a rotation speed of 100 rpm for 10 minutes, thereby preparing a material for a positive electrode (P-1).

—Preparation of Materials for Positive Electrode (P-2) to (P-9) and (CP-1) to (CP-3)—

Materials for a positive electrode (P-2) to (P-9) and (CP-1) to (CP-3) were prepared using the same method as for the material for a positive electrode (P-1) except for the fact that the composition was changed as shown in Table 1.

Meanwhile, the amounts of all of dispersion media used were 12.3 g as in the material for a positive electrode (P-1).

The components of the materials for a positive electrode are summarized in Table 1.

Here, the materials for a positive electrode (P-1) to (P-9) were materials for a positive electrode satisfying the specifications of the present invention, and (CP-1) to (CP-3) were materials for a positive electrode for comparison.

—Preparation of Material for Negative Electrode (N-1)—

180 zirconia beads having a diameter of 5 mm were injected into a 45 mL zirconia container (manufactured by Fritsch Japan Co., Ltd.), and the LI—P—S-based glass synthesized above (4.0 g) and heptane (12.3 g) as a dispersion medium were injected thereinto. The container was set in a planetary ball mill P-7, and the components were mixed at a temperature of 25° C. and a rotation speed of 300 rpm for two hours. After that, CGB20 (trade name, manufactured by Nippon Kokuen Group) (5.0 g) as an active material and the sample B synthesized above (1.0 g) as an auxiliary conductive agent were injected into the container, similarly, the container was set in the planetary ball mill P-7, and the components were continuously mixed at a temperature of 25° C. and a rotation speed of 200 rpm for 15 minutes, thereby preparing a material for a negative electrode.

—Preparation of Materials for Negative Electrode (N-2), (CN-1), and (CN-2)—

Materials for a negative electrode (N-2), (CN-1), and (CN-2) were prepared using the same method as for the material for a negative electrode (N-1) except for the fact that the composition was changed as shown in Table 1.

Meanwhile, the amounts of all of dispersion media used were 12.3 g as in the material for a negative electrode (N-1).

The components of the materials for a negative electrode are summarized in Table 1.

Here, the materials for a negative electrode (N-1) and (N-2) were materials for a negative electrode satisfying the specifications of the present invention, and (CN-1) and (CN-2) were materials for a negative electrode for comparison.

In Table 1, the materials for a positive electrode and the materials for a negative electrode are expressed as the materials for an electrode.

TABLE 1

| Material for electrode | Solid electrolyte Kind | % by mass | Active material Kind | % by mass | Auxiliary conductive agent Kind | % by mass | Dispersion medium Kind |
|---|---|---|---|---|---|---|---|
| P-1 | Li—P—S | 30 | LCO | 68 | FT-1000 | 2 | Heptane |
| P-2 | Li—P—S | 30 | LCO | 68 | FT-2000 | 2 | Heptane |
| P-3 | Li—P—S | 30 | NMC | 68 | FT-3000 | 2 | Heptane |
| P-4 | Li—P—S | 30 | NMC | 68 | FS-10P | 2 | Heptane |
| P-5 | Li—P—S | 30 | NCA | 68 | Sample A | 2 | Heptane |
| P-6 | Li—P—S | 30 | NCA | 68 | Sample B | 2 | Heptane |
| P-7 | Li—P—S | 30 | NCA | 68 | Sample C | 2 | Isobutyronitrile |
| P-8 | Li—P—S | 30 | NCA | 69 | Sample C | 1 | Heptane |
| P-9 | Li—P—S | 30 | NCA | 69.5 | Sample C | 0.5 | Heptane |
| N-1 | Li—P—S | 40 | CGB20 | 50 | Sample B | 10 | Heptane |
| N-2 | Li—P—S | 30 | Sn | 65 | Sample C | 5 | Isobutyronitrile |
| CP-1 | Li—P—S | 30 | LCO | 65 | AB | 5 | Heptane |
| CP-2 | Li—P—S | 30 | LCO | 65 | Passtran 6010 | 5 | Isobutyronitrile |
| CP-3 | Li—P—S | 30 | LCO | 65 | Sample D | 5 | Heptane |
| CN-1 | Li—P—S | 40 | Si | 50 | AB | 10 | Heptane |
| CN-2 | Li—P—S | 40 | CGB20 | 60 | — | — | Isobutyronitrile |

<Notes of Table 1>
(1) Li—P—S: Li—P—S-based glass synthesized above
(2) LCO: LiCoO$_2$ lithium cobalt oxide, manufactured by Nippon Chemical Industrial Co., Ltd.
(3) NMC: LiNi$_{0.33}$Co$_{0.33}$Mn$_{0.33}$O$_2$ lithium nickel manganese cobalt oxide
(4) NCA: LiNi$_{0.80}$Co$_{0.15}$Al$_{0.05}$O$_2$ lithium nickel cobalt aluminum oxide
(5) CGB20: trade name, negative electrode active material manufactured by Nippon Kokuen Group
(6) FT-1000: trade name, manufactured by Ishihara Sangyo Kaisha, Ltd., an auxiliary conductive agent obtained by coating a titanium oxide base material with Sb-doped SnO$_2$, specific surface area: 15 m$^2$/g, average value of minor axis lengths (average value (B)): 130 nm, aspect ratio: 13
(7) FT-2000: trade name, manufactured by Ishihara Sangyo Kaisha, Ltd., an auxiliary conductive agent obtained by coating a titanium oxide base material with Sb-doped SnO$_2$, specific surface area: 13 m$^2$/g, average value of minor axis lengths (average value (B)): 210 nm, aspect ratio: 14
(8) FT-3000: trade name, manufactured by Ishihara Sangyo Kaisha, Ltd., an auxiliary conductive agent obtained by coating a titanium oxide base material with Sb-doped SnO$_2$, specific surface area: 5 m$^2$/g, average value of minor axis lengths (average value (B)): 270 nm, aspect ratio: 19
(9) FS-10P: trade name, manufactured by Ishihara Sangyo Kaisha, Ltd., an auxiliary conductive agent obtained by coating a titanium oxide base material with Sb-doped SnO$_2$, specific surface area: 30 m$^2$/g, average value of minor axis lengths (average value (B)): 15 nm, aspect ratio: 70
(10) Samples A to D: the auxiliary conductive agents synthesized above
(11) AB: Acetylene black
(12) Passtran 6010; trade name, SnO$_2$ manufactured by Mitsui Mining & Smelting Co., Ltd., specific surface area: 55 m$^2$/g, average value of minor axis lengths (average value (B)): 800 nm, aspect ratio: 1

—Preparation of Solid Electrolyte Composition—

180 zirconia beads having a diameter of 5 mm were injected into a 45 mL zirconia container (manufactured by Fritsch Japan Co., Ltd.), the Li—P—S-based glass synthesized above (10.0 g) and isobutyronitrile (15.0 g) as a dispersion medium were injected thereinto. After that, the container was set in a planetary ball mill P-7 manufactured by Fritsch Japan Co., Ltd., and the components were continuously stirred at a temperature of 25° C. and a rotation speed of 300 rpm for two hours, thereby preparing a solid electrolyte composition.

—Production of Negative Electrode Sheet for All-Solid State Secondary Battery—

The material for a negative electrode (CN-2) prepared above was applied onto a 20 μm-thick copper foil using an applicator (trade name: SA-201 Baker type applicator, manufactured by Tester Sangyo Co., Ltd.), heated at 80° C. for one hour, and then further dried at 110° C. for one hour. After that, the material for a negative electrode was heated (at 120° C.) and pressurized (10 MPa for one minute) using a heat pressing machine, thereby producing a negative electrode sheet for an all-solid state secondary battery having a laminated structure of the negative electrode active material layer and the copper foil.

The solid electrolyte composition prepared above was applied onto the negative electrode active material layer produced above using the applicator, heated at 80° C. for one hour, and then further heated at 110° C. for six hours. A sheet having the solid electrolyte layer formed on the negative electrode active material layer was heated (at 120° C.) and pressurized (10 MPa for one minute) using the heat pressing machine, thereby producing a negative electrode sheet for an all-solid state secondary battery.

—Production of Positive Electrode Sheets for All-Solid State Secondary Battery—

The material for a positive electrode (P-1) prepared above was applied onto a 20 μm-thick aluminum foil using an applicator, heated at 80° C. for one hour, and then further dried at 110° C. for one hour. After that, the composition was heated (at 120° C.) and pressurized (10 MPa for one minute) using a heat pressing machine, thereby producing a positive electrode sheet for an all-solid state secondary battery having a laminated structure of a positive electrode active material layer and the aluminum foil.

—Manufacturing of All-Solid State Secondary Battery—

Figure 2:
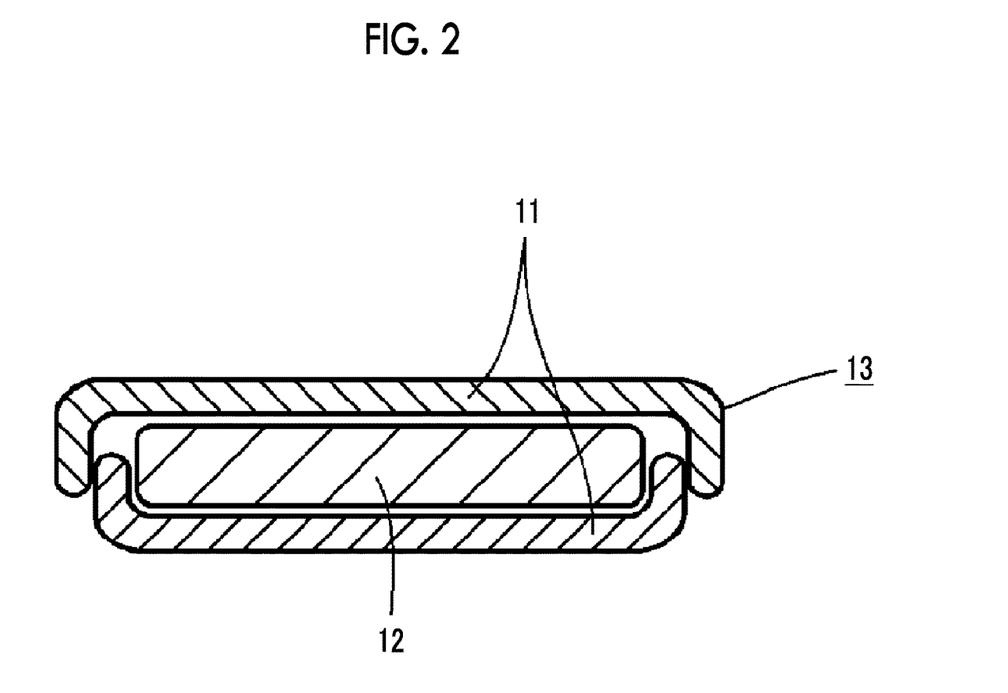
FIG. 2 is a vertical cross-sectional view schematically illustrating a testing device used in examples.

A disc-shaped piece having a diameter of 14.5 mm was cut out from the negative electrode sheet for an all-solid state secondary battery manufactured above and put into a 2032-type coin case into which a spacer and a washer were combined so that the coated surface of the material for an electrode of the positive electrode sheet for an all-solid state secondary battery cut out to a disc shape having a diameter of 13.0 mm and the solid electrolyte layer faced each other. An all-solid state secondary battery (a coin battery having the constitution of FIG. 2) of Test No. 101 shown in Table 2 was manufactured. Nos. 102 to 111 and c11 to c13 shown in Table 2 were manufactured in the same manner.

The sheet for an all-solid state secondary battery in the 2032-type coin case had the constitution of FIG. 1 and had a laminated structure of the negative electrode sheet for an all-solid state secondary battery (the copper foil/the negative electrode active material layer)/the solid electrolyte layer/the positive electrode sheet for an all-solid state secondary battery (the copper foil/the positive electrode active material layer). The layer thicknesses of the positive electrode active material layer, the negative electrode active material layer, and the solid electrolyte layer were 45 µm 30 µm, and 40 µm respectively in this order.

The all-solid state secondary batteries of Test Nos. 101 to 111 and c11 to c13 manufactured above were evaluated as described below.

—Measurement of Discharge Capacity—

The all-solid state secondary battery manufactured above was measured using a charge-discharge test system "TOSCAT-3000" (trade name) manufactured by Toyo System Co., Ltd.

The all-solid state secondary battery was charged at a current value of 0.2 mA until the battery voltage reached 4.2 V and discharged at a current value of 0.2 mA until the battery voltage reached 3.0 V. The above-described operation was considered as one cycle, the same charge and discharge operation was repeated, and the discharge capacity at the third cycle was considered as the discharge capacity of the battery. The discharge capacity in a positive electrode area of 100 cm$^2$ was expressed as "capacity" in Table 2. Meanwhile, discharge capacities of 120 mAh or more are on passing levels of the present test.

—Evaluation of Output Characteristic—

The output characteristic of the all-solid state secondary battery manufactured above was measured using a charge-discharge test system "TOSCAT-3000" (trade name) manufactured by Toyo System Co., Ltd.

The all-solid state secondary battery was charged at a current value of 0.1 mA/cm$^2$ until the battery voltage reached 3.8 V and then discharged at 0.1 mA/cm$^2$ for 10 seconds, and the voltage value after the 10-second discharging was scanned.

Similarly, the all-solid state secondary battery was charged at a current value of 0.1 mA/cm$^2$ and discharged at individual current values of 0.2 mA/cm$^2$, 0.5 mA/cm$^2$, 2 mA/cm$^2$, and 5 mA/cm$^2$, and the voltage values after the 10-second discharging were scanned.

The vertical axis and the horizontal axis were considered to indicate the voltage and the current amount respectively, and "the current amounts when the voltage reached 2.5 V after 10-second discharging of the all-solid state secondary battery at a current value of 0.1 mA/cm$^2$ carried out until the battery voltage reached 3.8 V" were obtained by extrapolation on the basis of the respective current values described above (0.2 mA/cm$^2$, 0.5 mA/cm$^2$, 2 mA/cm$^2$, and 5 mA/cm$^2$) and the respective voltage values scanned after 10-second discharging at the respective current values described above. The output was computed from (2.5 V)× (the current amount obtained by extrapolation) and evaluated using the following standards per electrode area. Meanwhile, evaluations of "C" or higher are on passing levels of the present test.

(Evaluation Standards)

A: 25 mW/cm$^2$ or more

B: 20 mW/cm$^2$ or more and less than 25 mW/cm$^2$

C: 15 mW/cm$^2$ or more and less than 20 mW/cm$^2$

D: 10 mW/cm$^2$ or more and less than 15 mW/cm$^2$

E: Less than 10 mW/cm$^2$

TABLE 2

| Test No. | Positive electrode active material layer | | Solid electrolyte layer | | Negative electrode active material layer | | Battery evaluation | |
|---|---|---|---|---|---|---|---|---|
| | Kind | Weight per unit area (mg/cm$^2$) | Kind | Weight per unit area (mg/cm$^2$) | Kind | Weight per unit area (mg/cm$^2$) | Capacity (mAh) | Output characteristic |
| 101 | P-1 | 20 | Li—P—S | 60 | CN-2 | 11 | 130 | B |
| 102 | P-2 | 20 | Li—P—S | 60 | CN-2 | 11 | 120 | B |
| 103 | P-3 | 20 | Li—P—S | 60 | CN-2 | 13 | 160 | A |
| 104 | P-4 | 20 | Li—P—S | 60 | CN-2 | 13 | 140 | A |
| 105 | P-5 | 20 | Li—P—S | 60 | CN-2 | 13 | 160 | A |
| 106 | P-6 | 20 | Li—P—S | 60 | CN-2 | 16 | 170 | A |
| 107 | P-7 | 20 | Li—P—S | 60 | CN-2 | 16 | 180 | A |
| 108 | P-8 | 20 | Li—P—S | 60 | CN-2 | 16 | 185 | A |
| 109 | P-9 | 20 | Li—P—S | 60 | CN-2 | 16 | 200 | A |
| 110 | P-5 | 20 | Li—P—S | 60 | N-1 | 13 | 180 | A |
| 111 | CP-1 | 20 | Li—P—S | 60 | N-1 | 13 | 120 | C |
| c11 | CP-1 | 20 | Li—P—S | 60 | CN-2 | 11 | 90 | E |
| c12 | CP-2 | 20 | Li—P—S | 60 | CN-2 | 11 | 110 | E |
| c13 | CP-3 | 20 | Li—P—S | 60 | CN-2 | 11 | 100 | E |

<Notes of Table 2>

Weight per unit area (active material layer): The mass (mg) of the active material per unit area (cm$^2$) of the active material layer.

Weight per unit area (solid electrolyte layer): The mass (mg) of the sulfide-based inorganic solid electrolyte per unit area (cm$^2$) of the solid electrolyte layer.

As is clear from Table 2, it is found that the all-solid state secondary batteries of Test Nos. 101 to 111 which satisfied the specifications of the present invention have a great discharge capacity and an excellent output characteristic.

In contrast, the all-solid state secondary batteries of Test Nos. c11 to c13 produced using an auxiliary conductive agent which did not satisfy the specifications of the present invention failed to reach the pass levels in both the discharge capacity and the output characteristic.

The present invention has been described together with the embodiment; however, unless particularly specified, the present inventors do not intend to limit the present invention to any detailed portion of the description and consider that the present invention is supposed to be broadly interpreted within the concept and scope of the present invention described in the claims.

EXPLANATION OF REFERENCES

1: negative electrode collector

2: negative electrode active material layer

3: solid electrolyte layer
4: positive electrode active material layer
5: positive electrode collector
6: operation portion
10: all-solid state secondary battery
11: 2032-type coin case
12: electrode sheet for all-solid state secondary battery
13: coin battery

What is claimed is:

1. A material for an electrode comprising:
   an active material;
   a sulfide-based inorganic solid electrolyte having conductivity for ions of metal elements belonging to Group I or II of the periodic table; and
   an auxiliary conductive agent having at least one metal atom belonging to Group XII, XIII, or XIV of the periodic table,
   wherein a specific surface area of the auxiliary conductive agent is 1 to 500 m$^2$/g, and a ratio between a major axis length and a minor axis length of a particle constituting the auxiliary conductive agent is 1.5 or more.

2. The material for an electrode according to claim 1, wherein the auxiliary conductive agent includes at least one oxide of a metal atom belonging to Groups XII, XIII, and XIV of the periodic table.

3. The material for an electrode according to claim 1, wherein the metal atom belonging to Groups XII, XIII, and XIV of the periodic table is Zn, Cd, Ga, In, Ge, Sn, or Pb.

4. The material for an electrode according to claim 1, wherein the sulfide-based inorganic solid electrolyte is amorphous.

5. The material for an electrode according to claim 1, wherein a content of the auxiliary conductive agent is 0.01% to 10% by mass with respect to 100% by mass of all solid components.

6. An electrode sheet for an all-solid state secondary battery comprising:
   a layer of the material for an electrode according to claim 1 on a metal foil.

7. An all-solid state secondary battery comprising:
   a positive electrode active material layer;
   a negative electrode active material layer; and
   an inorganic solid electrolyte layer,
   wherein at least one of the positive electrode active material layer or the negative electrode active material layer is a layer of the material for an electrode according to claim 1.

8. A method for manufacturing an electrode sheet for an all-solid state secondary battery, comprising:
   applying the material for an electrode according to claim 1 onto a metal foil to produce an electrode active material layer.

9. A method for manufacturing an all-solid state secondary battery including a positive electrode active material layer, a solid electrolyte layer, and a negative electrode active material layer in this order, the method comprising:
   manufacturing the all-solid state secondary battery using the manufacturing method according to claim 8.

* * * * *